United States Patent
Sedayao et al.

(10) Patent No.: US 9,471,907 B2
(45) Date of Patent: Oct. 18, 2016

(54) HIGHLY GRANULAR CLOUD COMPUTING MARKETPLACE

(75) Inventors: Jeffrey C. Sedayao, San Jose, CA (US); Vishwa Hassan, Chandler, AZ (US); Cindy A. Smith, Cameron Park, CA (US); Hong Li, El Dorado Hills, CA (US); Christian D. Black, Sacramento, CA (US); Terry H. Yoshii, West Sacramento, CA (US); David W. Stone, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 12/974,926

(22) Filed: Dec. 21, 2010

(65) Prior Publication Data

US 2012/0158578 A1  Jun. 21, 2012

(51) Int. Cl.
| | | |
|---|---|---|
| *G06Q 40/00* | (2012.01) | |
| *G06Q 20/10* | (2012.01) | |
| *G06F 21/10* | (2013.01) | |
| *H04L 29/08* | (2006.01) | |
| *H04L 29/06* | (2006.01) | |

(52) U.S. Cl.
CPC .............. *G06Q 20/10* (2013.01); *G06F 21/10* (2013.01); *G06F 21/105* (2013.01); *H04L 29/06551* (2013.01); *H04L 29/08306* (2013.01); *H04L 29/08576* (2013.01); *H04L 67/10* (2013.01); *H04L 67/14* (2013.01)

(58) Field of Classification Search
CPC ...... G06F 21/10; G06F 21/105; G06F 20/10; H04L 29/06551; H04L 29/08306; H04L 29/08576; H04L 67/14; H04L 67/10
USPC .......................................................... 705/39
See application file for complete search history.

(56) References Cited

U.S. PATENT DOCUMENTS 6,003,061 A * 12/1999 Jones ........................ G06F 9/50
                                                        718/102
6,925,160 B1 * 8/2005 Stevens ................... G06Q 30/04
                                                      379/114.03

(Continued)

OTHER PUBLICATIONS

Li, K., & Cheng, K. (1991). A two-dimensional buddy system for dynamic resource allocation in a partitionable mesh connected system. J.Parallel Distrib.Comput., 12(1), 79-83. Retrieved from http://dialog.proquest.com/professional/docview/25520830?accountid=142257 on May 31, 2016.*

(Continued)

*Primary Examiner* — Kito R Robinson
(74) *Attorney, Agent, or Firm* — Jordan IP Law, LLC

(57) ABSTRACT

A system and method may provide for defining a usage policy for an available resource of a personal computing system, and transmitting the usage policy to a market broker. The market broker may identify a match between the usage policy and a request from another computing system, and generate a notification of the match. In addition, funds may be transferred from an account associated with the other computing system to an account associated with the personal computing system based on a remote usage of the available resource by the other computing system.

16 Claims, 2 Drawing Sheets

(56) References Cited

U.S. PATENT DOCUMENTS

| | | | | |
|---|---|---|---|---|
| 7,870,568 | B2* | 1/2011 | Bernardin | G06Q 10/06 709/202 |
| 8,041,616 | B2* | 10/2011 | Cullen, III | G06Q 10/06 705/26.4 |
| 2004/0021678 | A1* | 2/2004 | Ullah | G06F 9/5027 715/700 |
| 2004/0154016 | A1* | 8/2004 | Randall | G06F 9/45537 718/1 |
| 2004/0172629 | A1* | 9/2004 | Tene | G06F 9/45537 718/1 |
| 2005/0076233 | A1* | 4/2005 | Aarts | H04L 67/306 726/4 |
| 2006/0047815 | A1* | 3/2006 | Hamadi | G06F 9/5011 709/226 |
| 2006/0174323 | A1* | 8/2006 | Brown | H04L 63/0428 726/3 |
| 2007/0220009 | A1* | 9/2007 | Morris | G06F 21/6218 |
| 2008/0162159 | A1* | 7/2008 | Wang | G06Q 99/00 705/1.1 |
| 2008/0319910 | A1* | 12/2008 | Duffus | G06Q 30/06 705/52 |
| 2009/0073878 | A1* | 3/2009 | Carlberg | H04L 47/10 370/230 |
| 2010/0125664 | A1* | 5/2010 | Hadar | G06F 9/5072 709/224 |
| 2010/0192207 | A1* | 7/2010 | Raleigh | G06Q 10/06375 726/6 |
| 2010/0268632 | A1* | 10/2010 | Rosenthal | G06Q 40/08 705/37 |
| 2010/0332262 | A1* | 12/2010 | Horvitz | G06F 9/5027 705/4 |
| 2011/0016214 | A1* | 1/2011 | Jackson | G06F 9/5044 709/226 |
| 2011/0035248 | A1* | 2/2011 | Juillard | G06F 9/5072 709/226 |
| 2011/0145094 | A1* | 6/2011 | Dawson | G06F 9/5027 705/26.63 |
| 2011/0161391 | A1* | 6/2011 | Araujo | G06Q 10/06 709/201 |
| 2011/0251937 | A1* | 10/2011 | Falk | G06F 21/10 705/34 |
| 2011/0289329 | A1* | 11/2011 | Bose | G06F 1/329 713/320 |

OTHER PUBLICATIONS

O'Hearn, P. W., Yang, H., & Reynolds, J. C. (2009). Separation and information hiding. ACM Transactions on Programming Languages and Systems, 31(3), 11:1-11:50. Retrieved from http://dialog.proquest.com/professional/docview/620128302?accountid=142257 on May 31, 2016.*

"Open-source software for volunteer computing and grid computing" by Boinc, published by the Free Software Foundation, dated Nov. 3, 2010, available at: http://boinc.berkeley.edu/.

* cited by examiner

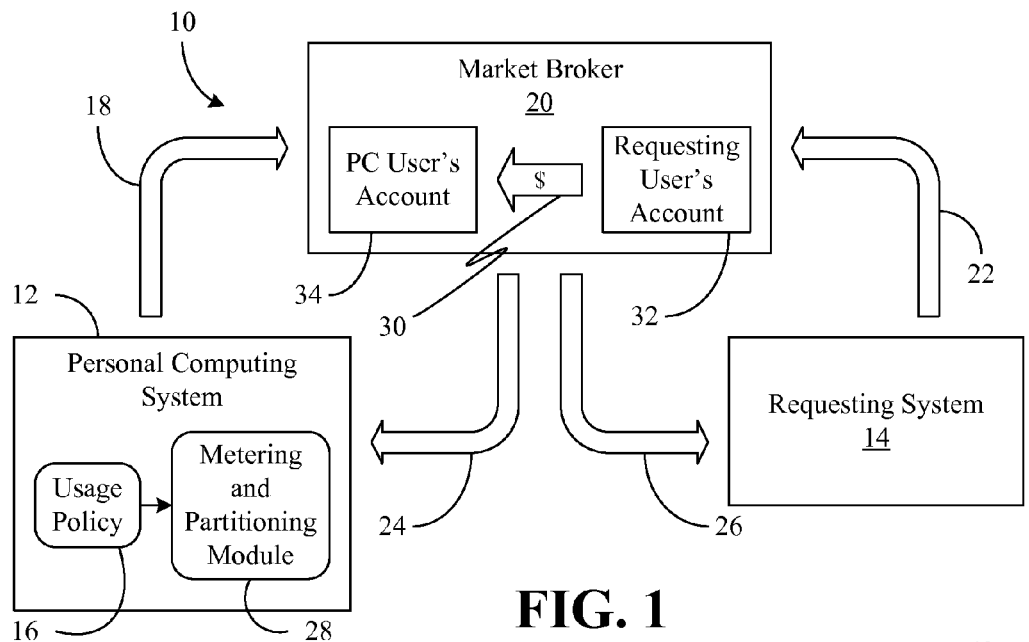
FIG. 1
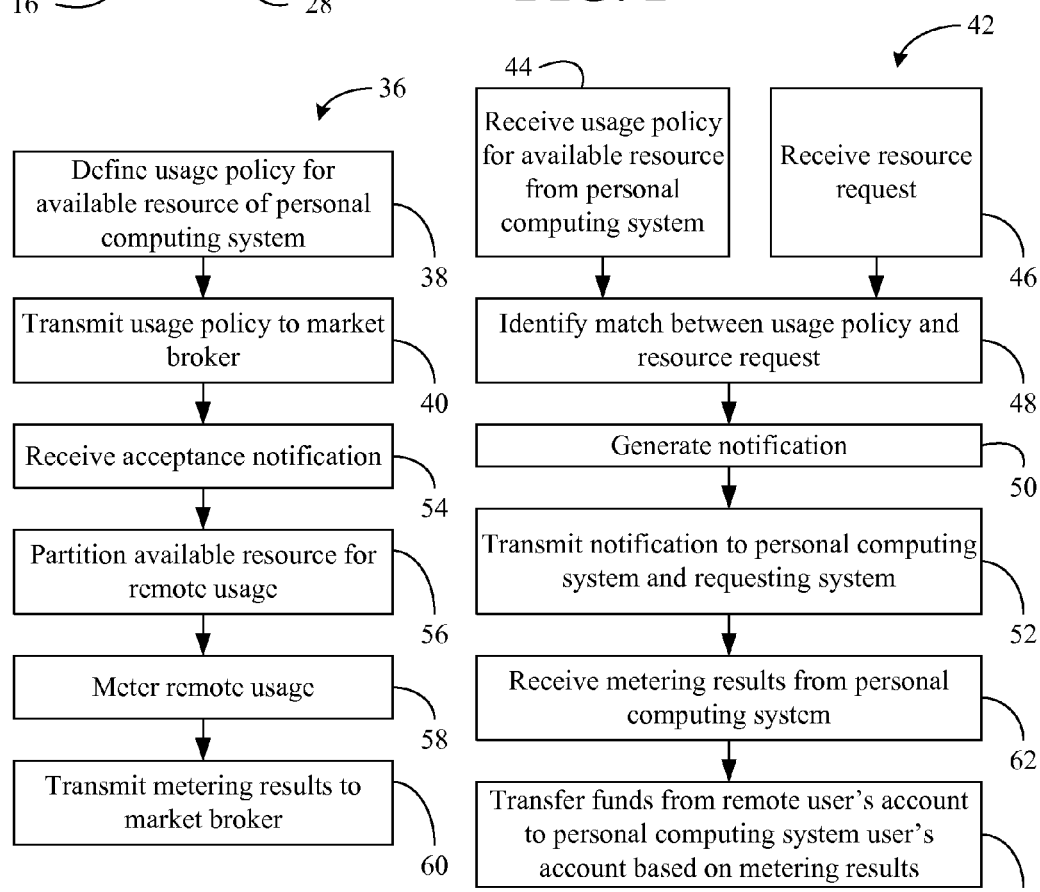
FIG. 2A
FIG. 2B

US 9,471,907 B2

HIGHLY GRANULAR CLOUD COMPUTING MARKETPLACE

BACKGROUND

1. Technical Field

Embodiments generally relate to cloud computing. More particularly, embodiments relate to the use of personal computing systems to provide resources for a cloud computing marketplace.

2. Discussion

Cloud computing may be used to remotely execute a wide variety of software applications. While conventional approaches to cloud computing may be suitable under certain circumstances, there remains considerable room for improvement. For example, cloud computing infrastructures may typically be limited to large banks of servers. Accordingly, traditional cloud computing solutions may lack granularity. Moreover, owners of personal computing systems might not be able to benefit financially from the availability of their system resources. In addition, the sale of cloud computing resources in conventional solutions may often be based only on price and the marketed resources may be limited to central processing unit (CPU) capacity.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of a highly granular cloud computing marketplace according to an embodiment;

FIG. 2A is a flowchart of an example of a method of providing available resources from a personal computing system to a cloud computing marketplace according to an embodiment;

FIG. 2B is a flowchart of an example of a method of brokering the exchange of available resources in a highly granular cloud computing marketplace according to an embodiment.

DETAILED DESCRIPTION

Figure 3:
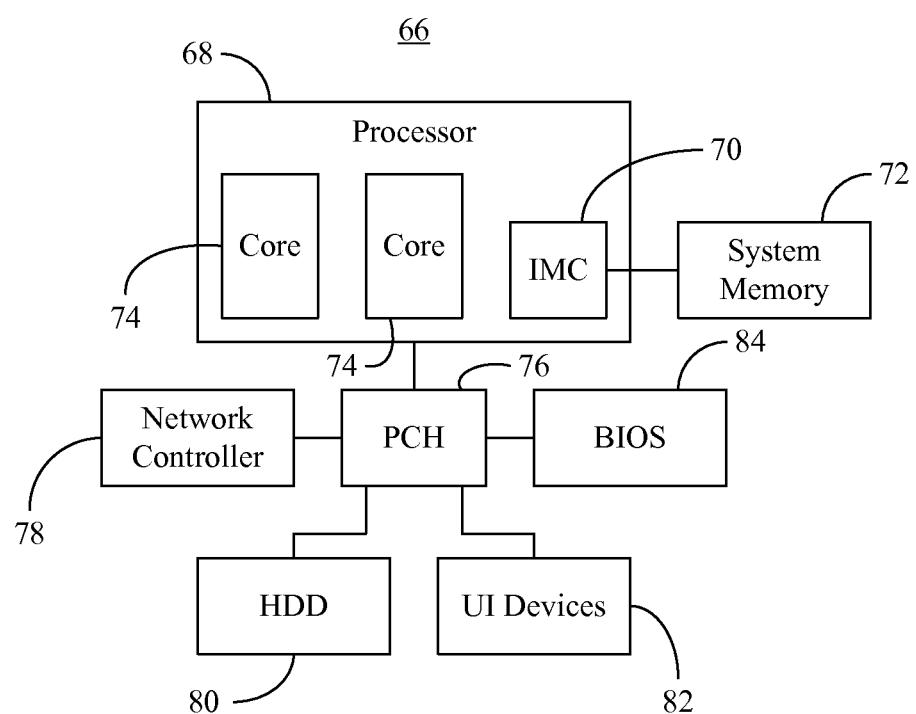
FIG. 3 is a block diagram of an example of a system according to an embodiment.

Embodiments may provide a computer readable storage medium including logic which, if executed by a processor, causes a personal computing system to define a usage policy for an available resource of the personal computing system. The logic may also cause the personal computing system to transmit the usage policy to a market broker.

Embodiments may also include a computer readable storage medium having logic which, if executed by a processor, cause a computer to identify a match between a usage policy of an available resource of a first computing system and a request from a second computing system. The first computing system may include a personal computing system, and the logic may also cause a computer to generate a notification of the match. Additionally, the logic may cause a computer to transfer funds from an account associated with a user corresponding to the second computing system to an account associated with a user corresponding to the personal computing system based on a remote usage of the available resource by the second computing system.

Embodiments may also include a personal computing system having a processor, a network controller and a computer readable storage medium with logic which, if executed by the processor, causes the personal computing system to define a usage policy for an available resource of the personal computing system. Additionally, the logic may cause the personal computing system to transmit the usage policy to a market broker via the network controller.

Turning now to FIG. 1, a marketplace 10 is shown in which a personal computing (PC) system 12 offers available (e.g., spare) internal resources such as storage component capacity and processor capacity for remote usage by other computing systems such as a requesting system 14. In the illustrated example, the PC system 12, which might include a desktop computing system or mobile computing system (e.g., laptop, personal digital assistant (PDA), mobile Internet device (MID), wireless smart phone, media player, imaging device, etc.), or even cloud resources that have been purchased, borrowed from other people or organizations or otherwise obtained and are not fully utilized, defines a usage policy 16 for the available resource and transmits the usage policy 16 in a message 18 to a market broker 20. The usage policy 16 may include one or more operating characteristics of the available resource. For example, the operating characteristics might include an availability property of the resource (e.g., availability time window), a network latency property associated with remotely accessing the resource (e.g., packet loss metrics, quality of service terms), a security level property of the resource, and so on. The message 18 may also include other information such as an offered price per appropriate unit (e.g., bytes of storage, number of processor cycles).

The illustrated market broker 20 receives the message 18 containing the usage policy 16 and determines whether there is a match with a request from another computing system such as a request 22 from the requesting system 14. In particular, the market broker 20 may identify a condition in which a requirement of the request 22 is met by an operating characteristic of the usage policy 16. For example, the request 22 might indicate that processing capacity is needed from 10:00 AM to 11:00 AM on a given date and the usage policy 16 may indicate an availability of a processor core of the PC system 12 during those hours. In such a case, the illustrated market broker 20 generates notifications 24, 26 of the match, and transmits the notifications 24, 26 to the PC system 12 and requesting system 14, respectively. In another example, the notifications 24, 26 may be generated in response to the request 22 indicating that a minimum network latency is required for access to a certain amount of remote storage capacity, and the usage policy 16 indicating that its network latency meets that requirement. Similar functionality may be provided for other operating condition matches such as security matches, and so on.

If the market broker 20 successfully negotiates a pricing agreement between the PC system 12 and the requesting system 14, the PC system 12 may use a metering and partitioning module 28 to partition the requested resource for remote usage and meter the usage of the available resource by the requesting system 14. The PC system 12 may also notify the market broker 20 of the metered usage amount, wherein the illustrated market broker 20 transfers funds 30 from a user account 32 associated with the requesting system 14 to a user account 34 associated with the PC system 12 based on the remote usage of the available resource by the requesting system 14. The metering functionality may be used to enforce a fixed usage arrangement in which the remote usage is terminated and the market broker 20 is notified once the agreed upon amount of storage capacity or processor capacity has been used, or to charge the requesting user's account 32 on an ongoing basis. Moreover, the transfer of funds 30 may be executed before the remote usage takes place (e.g., on a prepaid basis) or after the remote usage takes place (e.g., on an ongoing basis).

FIGS. 2A and 2B show methods 36 and 42 of providing available resources to a cloud computing marketplace and brokering the exchange of available resources in a cloud computing marketplace, respectively. The illustrated method 36 may be implemented in executable software of a PC system 12 (FIG. 1) as a set of metering and partitioning logic instructions stored in a machine or computer readable storage medium of a memory such as random access memory (RAM), read only memory (ROM), programmable ROM (PROM), flash memory, etc., in fixed-functionality logic hardware using circuit technology such as, for example, application specific integrated circuit (ASIC), complementary metal oxide semiconductor (CMOS) or transistor-transistor logic (TTL) technology, or any combination thereof. In addition, the method 42 might be implemented in executable software of a market broker 20 (FIG. 1) as a set of logic instructions stored in a machine or computer readable storage medium of a memory such as RAM, ROM, PROM, flash memory, etc., in fixed-functionality logic hardware using circuit technology such as, for example, ASIC, CMOS or TTL technology, or any combination thereof.

For example, computer program code to carry out operations shown in the methods 36, 42 may be written in any combination of one or more programming languages, including an object oriented programming language such as Java, Smalltalk, C++ or the like and conventional procedural programming languages, such as the "C" programming language or similar programming languages. On the other hand, fixed-functionality hardware or lower-level firmware instructions such as assembly language programming or machine code might be used to carry out operations shown in the methods 36, 42.

The illustrated PC system processing block 38 provides for defining a usage policy for an available resource of a PC system. As already noted, the usage policy may include specific operating characteristics such as availability, network latency and security information regarding the available resource, wherein the available resource may include a storage component, a processor core, etc., and the PC system may include a desktop computing system, a mobile computing system, other unused computing resources such as purchased cloud computing resources, etc. The usage policy may be transmitted to a market broker at PC system block 40. Market broker block 44 provides for receiving the usage policy, wherein a request for an available resource may also be received at market broker block 46. The request might be received from any system that may benefit from additional storage capacity and/or processing capacity. Moreover, the usage policy and request need not be received in parallel. Indeed, in a large scale cloud computing marketplace as described herein, many usage policies and requests might be received from different sources at different moments in time, wherein the market broker may store, track, organize, arrange, etc., the usage policies and requests using various different data structures such as databases, linked lists, and so on, and dynamically negotiate the exchange of available resources between the entities involved.

Illustrated market broker block 48 provides for identifying a match between the usage policy and the request. As already noted, the match identification may involve determining that an operating characteristic of the usage policy satisfies a requirement of the request. In this regard, the use of the operating characteristic in addition to price may provide a substantially more robust approach to linking cloud computing resource providers to cloud computing resource consumers. A notification of the match may be generated at market broker block 50, wherein illustrated market broker block 52 provides for transmitting the notification to the PC system corresponding to the usage policy and the computing system corresponding to the request.

Upon detection of the acceptance/match notification at PC system block 54, illustrated block 56 provides for partitioning the available resource for remote usage. Alternatively, the available resource might be partitioned at another moment in time such as when the resource is first offered to the cloud computing marketplace or whenever an availability window opens (e.g., nightly during off-peak working hours). Moreover, the exchange of the acceptance notification may include additional functionality such as an iterative price negotiation between the PC system and the requesting system, wherein the negotiation may be facilitated by the market broker. PC system block 58 may provide for metering the usage of the available resource by the remote computing system, wherein the metering results may be transmitted to the market broker at PC system block 60.

Illustrated market broker block 62 provides for receiving the metering results from the PC system, wherein funds may be transferred from an account associated with the requesting system to an account associated with the PC system at block 64 based on the remote usage of the available resource of the PC system. As already noted, the funds transfer may alternatively be conducted at an earlier time such as when an agreement on price is reached (e.g., on a prepaid basis), or at later time such as at the end of a billing period (e.g., on an ongoing basis). In any event, the individual/user associated with the PC system is able to receive payment for the remote usage of the available resources of the individual's PC system in the illustrated approach. Accordingly, a much more granular cloud computing marketplace may be achieved.

FIG. 3 shows a personal computing (PC) system 66, wherein the system 66 may be part of a mobile platform such as a laptop, personal digital assistant (PDA), mobile Internet device (MID), tablet, wireless smart phone, media player, imaging device, etc., or any combination thereof. The PC system 66 may also be part of a fixed platform such as a desktop, workstation, etc. The illustrated PC system 66 includes a host processor 68 that might include an integrated memory controller (IMC) 70 that provides access to system memory 72, which may include, for example, double data rate (DDR) synchronous dynamic random access memory (SDRAM, e.g., DDR3 SDRAM JEDEC Standard JESD79-3C, April 2008) modules. The modules of the system memory 72 may be incorporated into a single inline memory module (SIMM), dual inline memory module (DIMM), small outline DIMM (SODIMM), and so on. The processor 68 may also have one or more processor cores 74, where each core 74 may be fully functional with instruction fetch units, instruction decoders, level one (L1) cache, execution units, and so on. In one example, the internal cache(s) (not shown) of the processor 68 may be implemented in static RAM (SRAM).

The illustrated processor 68 communicates with a platform controller hub (PCH) 76, also known as a Southbridge in certain systems. The PCH 76 may have internal controllers (not shown) such as, for example, USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The PCH 76 may communicate with a network controller 78, which may provide off-platform communication functionality for a wide variety of purposes such as, for example, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The illustrated PCH 76 is also coupled to a basic input/output system (BIOS) 84 and one or more mass storage devices, which may include a hard disk drive (HDD) 80. Mass storage may also include ROM, optical disk, flash memory, etc. (not shown). In addition, the PCH 76 may provide support for user interface (UI) devices 82 such as a microphone, display, keypad, mouse, speakers, etc., in order to allow a user to interact with and perceive information from the system 66.

The cores 74 may execute a metering and partitioning module 28 (FIG. 1) as well as define one or more usage policies 16 (FIG. 1) for available resources in the PC system 66. The usage policies may be transmitted to a market broker via the network controller 78, wherein the market broker may identify matches between the usage policies and requests from other computing systems. As matches are identified, the available resources of the PC system 66 might be configured for remote usage by the other computing systems. For example, one or more of the cores 74 may be partitioned for remote usage and offered, via a market broker, to a cloud computing marketplace as additional processing capacity. Additionally, the HDD 80 or other mass storage devices might be partitioned for remote usage and offered to the cloud computing marketplace as additional storage capacity.

Thus, the PC-based cloud computing techniques described herein may provide the ability to cross private and public cloud boundaries, resulting in greater capacity, enhanced flexibility for utilization of resources, and captured opportunities for total cost of ownership (TCO) reduction and revenue production. Moreover, these techniques may enable movement of workloads across resource provider and organizational boundaries to the resource providers that best satisfy the appropriate service requirements at the lowest cost. Indeed, owning a PC system may now be considered a more valuable proposition, as any PC system may be used to produce income under the approaches described herein.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A non-transitory computer readable storage medium comprising logic which, if executed by a processor, causes a personal computing system to:
    define a usage policy for an available internal resource of the personal computing system, wherein the available internal resource is to include at least one of a storage component capacity and a processor capacity and be partitioned for the usage by the remote computing system, and wherein the personal computing system is to be at least one of a desktop computing system and a mobile computing system;
    transmit the usage policy from the personal computing system to a market broker located between the personal computing system and a remote computing system to offer the available internal resource as additional resource capacity for usage by the remote computing system, wherein the usage policy is to include an operating characteristic regarding operation of the available internal resource that is to be offered to the remote computing system directly by the market broker for usage by the remote computing system after the market broker is to determine a requirement for the operating characteristic that names the available internal resource in a request by the remote computing system is satisfied;
    meter the usage of the available internal resource by the remote computing system at the personal computing system to generate a metering result; and
    send a notification including the metering result from the personal computing system to the market broker to notify of the usage to transfer funds.

2. The medium of claim 1, wherein the logic, if executed, further causes the personal computing system to receive an acceptance notification from the market broker indicating acceptance to use the available internal resource by the remote computing system, wherein the usage of the available internal resource is to be based on the acceptance notification, and wherein the market broker is to charge an account associated with the remote computing system to transfer the funds to an account associated with the personal computing system.

3. The medium of claim 1, wherein the logic, if executed, further causes the personal computing system to transmit an offered price per unit associated with the available internal resource, and wherein the funds are to be transferred based on an iterative price negotiation that is to be facilitated by the market broker between the personal computing system and the remote computing system.

4. The medium of claim 1, wherein the operating characteristic is to include a security level property.

5. The medium of claim 1, wherein the available internal resource is partitioned upon receipt of the acceptance notification for the usage by the remote computing system.

6. The medium of claim 1, wherein the available internal resource is partitioned when the available internal resource is to be offered for the usage by the remote computing system.

7. The medium of claim 1, wherein the available internal resource is partitioned when an availability window is to be opened for the usage by the remote computing system.

8. The medium of claim 1, wherein the operating characteristic is to include at least one of an availability property, a network latency property and a security property of the available resource, wherein the requirement for the availability property is to specify an availability time for the available internal resource, and wherein the requirement for the network latency property is to specify a latency tolerance associated with a remote access of the available internal resource by the remote computing system.

9. The medium of claim 8, wherein the network latency property is to specify the latency tolerance based on at least one of a packet loss metric and a quality of service term.

10. The medium of claim 8, wherein the availability property is to specify an availability time window.

11. A non-transitory computer readable storage medium comprising logic which, if executed by a processor, causes a computer to:
    receive a usage policy for an available internal resource from a first computing system to be used to offer the available internal resource of the first computing system as additional resource capacity for usage by a second computing system, wherein the usage policy is to include an operating characteristic regarding operation of the available internal resource that is to be offered directly by the computer to the second computing system for usage by the second computing system after the computer is to determine a requirement for the operating characteristic that names the available internal resource in a request by the second computing system is satisfied, wherein the available internal resource is to include at least one of a storage component capacity and a processor capacity and be partitioned for the usage by the remote computing system, and wherein the first computing system is to include a personal computing system that is to be at least one of a desktop computing system and a mobile computing system;
    receive the request from the second computing system;
    identify a match between the usage policy of the first computing system and the request from the second computing system based on the operating characteristic;
    generate a notification of the match, the notification of the match to be transmitted at least to the first computing system;
    receive a notification from the first computing system including a metering result, wherein the metering result is to notify of usage of the available internal resource by the second computing system that is to be metered by the first computing system;
    transfer funds from an account associated with the second computing system to an account associated with the first computing system based on the usage of the available internal resource by the second computing system.

12. The medium of claim 11, wherein the operating characteristic is to include at least one of an availability property, a network latency property and a security property of the available resource, wherein the requirement for the availability property is to specify an availability time for the available internal resource, and wherein the requirement for the network latency property is to specify a latency tolerance associated with a remote access of the available internal resource by the second computing system.

13. The medium of claim 11, wherein the instructions, if executed, further cause a computer to transmit the notification of the match to the personal computing system and the second computing system.

14. A personal computing system comprising:
a processor;
a network controller; and
a computer readable storage medium comprising logic which, if executed by the processor, causes the personal computing system to,
define a usage policy for an internal available resource of the personal computing system, wherein the available internal resource is to include at least one of a storage component capacity and a processor capacity and be partitioned for the usage by the remote computing system, and wherein the personal computing system is to be at least one of a desktop computing system and a mobile computing system,
transmit the usage policy from the personal computing system to a market broker located between the personal computing system and a remote computing system via the network controller to offer the available internal resource as additional resource capacity for usage by the remote computing system, wherein the usage policy is to include an operating characteristic regarding operation of the available internal resource that is to be offered directly by the market broker to the remote computing system for usage by the remote computing system after the market broker is to determine a requirement for the operating characteristic that names the available internal resource in a request by the remote computing system is satisfied,
meter the usage of the available internal resource by the remote computing system at the personal computing system to generate a metering result, and
send a notification including the metering result from the personal computing system to the market broker to notify of the usage to transfer funds.

15. The personal computing system of claim 14, wherein the logic, if executed, further causes the personal computing system to receive an acceptance notification from the market broker indicating acceptance to use the available internal resource by the remote computing system, wherein the usage of the available internal resource is to be based on the acceptance notification, and wherein the market broker is to charge an account associated with the remote computing system to transfer the funds to an account associated with the personal computing system.

16. The personal computing system of claim 14, wherein the operating characteristic is to include at least one of an availability property, a network latency and a security property of the available resource, wherein the requirement for the availability property is to specify an availability time for the available internal resource, and wherein the requirement for the network latency is to specify a latency tolerance associated with a remote access of the available internal resource by the remote computing system.

* * * * *